United States Patent
Miyauchi

(10) Patent No.: US 6,967,451 B2
(45) Date of Patent: Nov. 22, 2005

(54) BACK DOOR OPENING AND CLOSING APPARATUS

(75) Inventor: Kazutoshi Miyauchi, Yokohama (JP)

(73) Assignee: Jidosha Denki Kogyo Co., Ltd., Yokohama (JP)

( * ) Notice: Subject to any disclaimer, the term of this patent is extended or adjusted under 35 U.S.C. 154(b) by 0 days.

(21) Appl. No.: 10/990,513

(22) Filed: Nov. 18, 2004

(65) Prior Publication Data
US 2005/0151495 A1   Jul. 14, 2005

(30) Foreign Application Priority Data
Nov. 25, 2003   (JP) .......................... P2003-393573

(51) Int. Cl.$^7$ .............................................. H02P 1/04
(52) U.S. Cl. ....................... 318/443; 318/445; 318/280; 318/282; 318/432; 318/466; 49/26; 49/28; 49/280; 49/360; 701/45
(58) Field of Search ................ 318/280–286, 318/443, 445, 466, 468, 432–434; 49/26, 49/28, 279, 280, 360; 701/36, 45

(56) References Cited

U.S. PATENT DOCUMENTS

| | | | | |
|---|---|---|---|---|
| 5,095,654 A | * | 3/1992 | Eccleston | 49/280 |
| 5,530,329 A | * | 6/1996 | Shigematsu et al. | 318/469 |
| 6,134,836 A | * | 10/2000 | Kawanobe et al. | 49/360 |
| 6,405,485 B1 | * | 6/2002 | Itami et al. | 49/280 |
| 6,425,206 B1 | * | 7/2002 | Noda et al. | 49/360 |
| 6,748,308 B2 | * | 6/2004 | Losey | 701/49 |

FOREIGN PATENT DOCUMENTS

JP   2003-27832   1/2003

* cited by examiner

Primary Examiner—Rina Duda
(74) Attorney, Agent, or Firm—McGinn IP Law Group, PLLC

(57) ABSTRACT

In operating to open or close a door (step S1), when an outside switch indicating whether a door knob portion is grabbed or not grabbed by the hand of an operator is brought into an ON state (grip state), or when a distance of moving the door is less than a predetermined angle after bringing the outside switch into an OFF state from the ON state (non-grip state) (step S6), a current threshold higher than a normal current threshold is set (step S3, step S7), a motor current and the current threshold is compared (step S4) and pinching of an obstacle of the door is detected (step S5).

6 Claims, 5 Drawing Sheets

BACK DOOR OPENING AND CLOSING APPARATUS

BACKGROUND OF THE INVENTION

1. Field of the Invention

The present invention relates to a back door opening and closing apparatus for generating a torque necessary for operating to open and close a back door by a motor in opening and closing the back door provided at a rear portion of a vehicle.

2. Related Art

In a background art, there is known a vehicle having an opening and closing member of a back door, a slide door or the like which is automatically opened and closed by driving, for example, a motor in JP-A-2003-27832 or the like shown below.

According to an automatic opening and closing apparatus of an opening and closing member for a vehicle described in JP-A-2003-27832, in opening and closing, for example, a back door, a state of opening and closing the back door is detected by detecting a rotational pulse of a motor and when the period of the rotational pulse becomes considerably smaller than a standard pulse period to constitute a pinching determining time period, the apparatus detects that pinching is brought about.

Particularly, according to the automatic opening and closing apparatus of the opening and closing member of the vehicle described in JP-A-2003-27832, in order to prevent a state of pinching a foreign matter from being erroneously recognized in opening and closing the back door, at a stage before reaching the pinching determining time period, a duty ratio which is an amount of supplying current of the motor is gradually increased until firmly determining the period of the rotational pulse. Thereby, according to the automatic opening and closing apparatus of the opening and closing member for the vehicle of the background, erroneous recognition of determining that the pinching is brought about can be prevented when pinching of the foreign matter is not brought about.

Further, it is known by the background art that a target operational speed is set depending on a position of operating the back door, and when an actual operational speed is less than the target operational speed, a value of current supplied to the motor is increased by increasing the duty ratio, the current value is compared with a previously set threshold and when the current value exceeds the threshold, it is determined that pinching of the foreign matter is brought about.

However, according to the above-described background, in the case of setting a threshold to the motor current value, when a door knob is operated to pull up by the hand of an operator in automatically operating the back door to open by the motor torque, the operational speed of the back door is increased and the current supplied to the motor is reduced in accordance therewith. Thereafter, when the operator detaches the hand from the door knob, the operational speed of the back door is reduced at the instance and therefore, the torque is generated at the motor to prevent the reduction in the operational speed and therefore, the motor current is increased.

At that occasion, according to the background art, it is necessary to rapidly increase the motor current in order to increase the motor torque and there is a case in which the motor current exceeds the threshold and it is erroneously detected that pinching of the foreign matter is brought about although pinching of the foreign matter is not brought about.

SUMMARY OF THE INVENTION

Hence, the invention has been proposed in view of the above-described actual situation and it is an object thereof to provide a door opening and closing apparatus for a vehicle capable of preventing erroneous detection of pinching of a foreign matter when a door is operated to open automatically by a torque of a motor.

According to a door opening and closing apparatus according to the invention, a motor for generating a torque for operating to open and close a door is provided with grip state detecting means for detecting a state in which a door knob portion provided at the door is grabbed by the hand of an operator, moving amount detecting means for detecting an amount of moving the door, and pinching detecting means for detecting pinching of an obstacle of the door by comparing a value of a motor current supplied to the motor and a current threshold.

According to such a door opening and closing apparatus, when a change of a state in which the door knob portion is not detected to be grabbed by the hand of the operator from a state in which the door knob portion is detected to be grabbed by the hand of the operator is detected by the grip state detecting means, in the case in which the amount of moving the door after bringing about the state in which the door knob portion is not detected to be grabbed by the hand of the operator is less than a predetermined moving amount, in the case in which the door knob portion is not detected to be grabbed by the hand of the operator, the pinching detecting means sets a current threshold higher than a current threshold set normally and detects pinching of an obstacle by the door to thereby resolve the above-described problem.

Further, according to the door opening and closing apparatus, when the change from the state in which the door knob portion is not detected to be grabbed by the hand of the operator from the state in which the door knob portion is detected to be grabbed by the hand of the operator is detected by the grip state detecting means, in the case in which the amount of moving the door in the state in which the door knob portion is not detected to be grabbed by the hand of the operator is less than the predetermined moving amount, the grabbing detecting means does not execute the processing of detecting pinching of the obstacle of the door to thereby resolve the above-described problem.

According to the door opening and closing apparatus according to the invention, when the state is detected to change from the state in which the door knob portion is detected to be grabbed by the hand of the operator to the state in which the door knob portion is not detected to be grabbed by the hand of the operator, in the case in which the amount of moving the door after bringing about the state in which the door knob portion is not detected to be grabbed by the hand of the operator is less than the predetermined moving amount, the current threshold higher than the normal current threshold is set to thereby detect pinching of the obstacle of the door and therefore, even when the motor current is increased at the instance at which the hand of the operator is detached from the door knob portion, there can be prevented erroneous detection of pinching a foreign matter when the door is automatically operated to open by the torque of the motor.

Further, according to the door opening and closing apparatus, when the state is detected to change from the state in which the door knob portion is detected to be grabbed by the hand of the operator to the state in which the door knob portion is not detected to be grabbed by the hand of the operator, in the case in which the amount of the moving door after bringing about the state in which the door knob portion is not detected to be grabbed by the hand of the operator is less than the predetermined moving amount, by not executing the processing of detecting the pinching of the obstacle of the door, even when the motor current is increased at the instance at which the hand of the operator is detached from the door knob portion, there can be prevented erroneous detection of pinching a foreign matter when the door is automatically operated to open by the torque of the motor.

DETAILED DESCRIPTION OF THE PREFERRED EMBODIMENTS

An explanation will be given of embodiments of the invention in reference to the drawings as follows.

Figure 1:
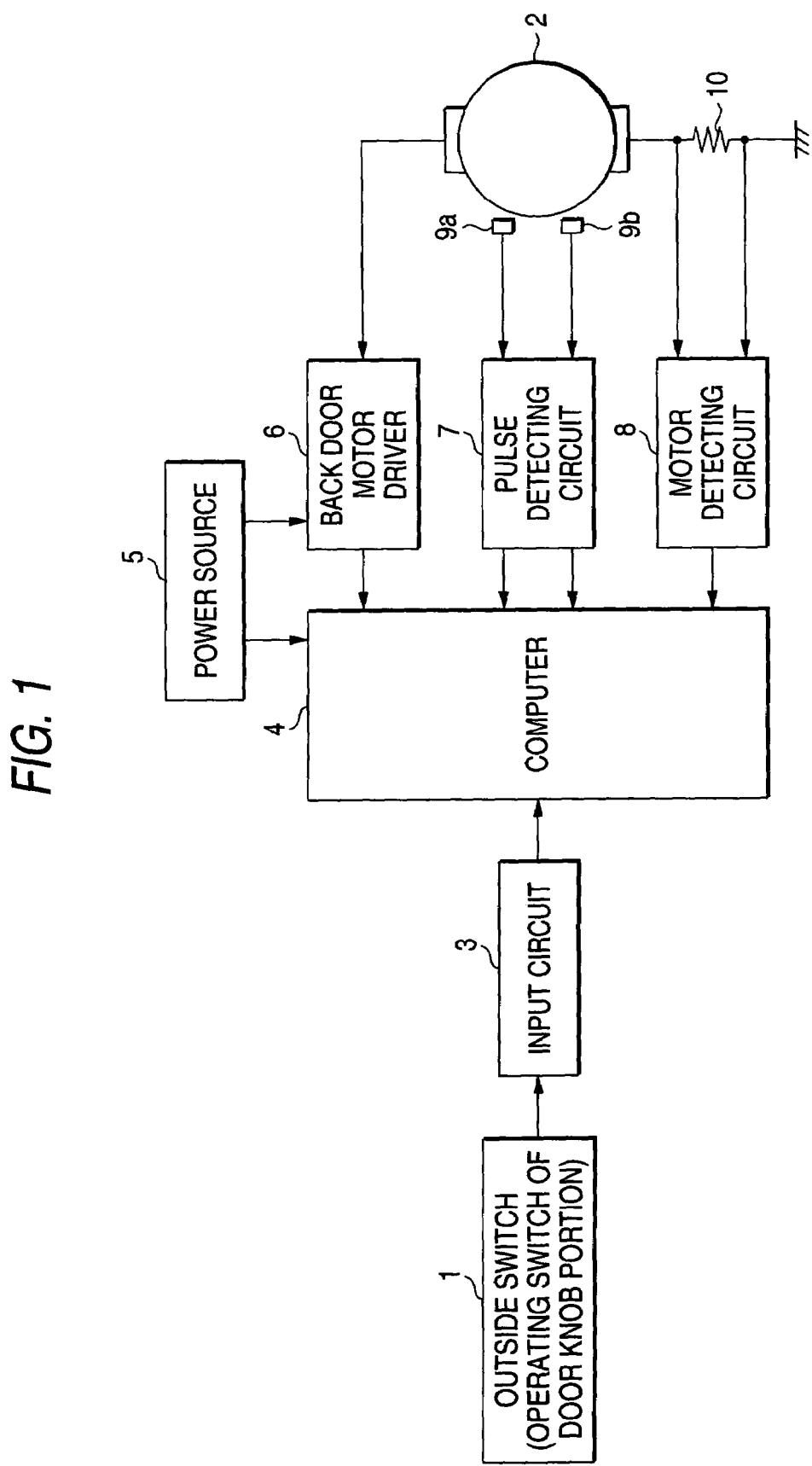
FIG. 1 is a block diagram showing a functional constitution of a back door opening and closing apparatus to which the invention is applied.

The invention is applied to a door opening and closing apparatus in a vehicle constituted as shown by, for example, FIG. 1. Although the door opening and closing apparatus of the invention is not limited to an activating device automatically opening and closing a back door of the vehicle, the explanation is given by the example of automatic opening and closing apparatus attached to a back door.

The invention may be applied to other door member in the vehicle. Further, the automatic opening and closing apparatus should not be limited to one which is capable of automatically opening and closing the door by itself invention, and it should include apparatus in which activation by electricity assists manual operations for opening and closing the door.

[Constitution of Back Door Automatic Opening and Closing Apparatus]

The back door automatic opening and closing apparatus is provided on a rear side of a vehicle and operated to open to an upper side by releasing a lock mechanism and drives the back door locked by the lock mechanism by operating the back door to close to a lower side. Further, although according to the example, an explanation will be given of the back door provided on the rear side of the vehicle, the example is applicable even to an apparatus of operating to open and closing other opening and closing member so far as the apparatus operates to open the door from the lower side to the upper side.

As shown by a functional block diagram in FIG. 1, the back door automatic opening and closing apparatus generates a torque to operate to open or operate to close the back door by driving a back door motor 2 by operating an outside switch 1 provided at a door knob portion of the back door and operated to depress by an operator. Here, the outside switch 1 detects operation of a door knob mechanism by bringing about an ON state from an OFF state when the door knob mechanism of the back door is grabbed by the operator and a state of operating the door knob mechanism is read by an input circuit 3. Further, by bringing the outside switch 1 from the ON state to the OFF state, a state of not operating the door knob mechanism is read by the input circuit 3.

The input circuit 3 monitors a state of detecting operation of the outside switch 1 and when the input circuit 3 reads that the outside switch 1 is brought from the OFF state to the ON state or the outside switch 1 is brought from the ON state to the OFF state, the input circuit 3 supplies a signal indicating the state of the outside switch 1 to a computer 4.

The computer 4 is connected with a power source 5, a back door motor driver 6, a pulse detecting circuit 7 and a motor current detecting circuit 8 and is constituted to store a program for controlling operation of the back door motor 2 in accordance with operation of the outside door switch 1 to a memory or the like, not illustrated. Further, the computer 4 controls a torque generated by the back door motor 2 by controlling the back door motor driver 6 by executing the program when the back door is operated to open or operated to close.

The power source 5 comprises a battery constituting a power source of operating the computer 4 and a power source of driving the back door motor 2. The power source 5 supplies power to the computer 4 and supplies power to the back door motor 2 via the back door motor driver 6 in operating the back door.

The back door motor driver 6 controls a value of current and a current supply direction supplied to the back door motor 2 by controlling voltage applied from the power source 5 to the back door motor 2 in accordance with a control signal of the computer 4.

Specifically, the back door motor driver 6 comprises an inverter circuit for controlling the value of the current supplied to the back door motor 2 and a switching circuit for switching a current supplying direction. Further, when the back door is operated to open, the back door motor driver 6 supplies current in a positive direction to the back door motor 2 to generate a torque in a direction of driving the back door from a closed state to an opened state. Further, when the back door is operated to close, the back door motor driver 6 supplies current in an inverse direction to the back door motor 2 to generate a torque in a direction of driving the back door from the opened state to the closed state.

Further, the back door motor driver 6 controls the value of the current supplied to the back door motor 2 by operating current supplied to the back door motor 2 ON/OFF by operating semiconductor switching elements for power constituting the inverter circuit ON/OFF when a signal of adjusting the torque generated at the back door motor 2, that is, a control signal indicating the duty ratio of a pulse voltage is transmitted from the computer 4.

According to the back door motor 2 driven in this way, a revolution number thereof is detected by the pulse detecting circuit 7. The pulse detecting circuit 7 is connected to Hall elements 9a, 9b additionally provided to the back door motor 2 and inputs a signal indicating a position of a magnetic pole at inside of the back door motor 2 rotated in synchronism with rotation of the back door motor 2 from the Hall elements 9*a*, 9*b*. Further, the pulse detecting circuit 7 generates a pulse signal in synchronism with rotation of the back door motor 2 to supply to the computer 4.

Thereby, the pulse detecting circuit 7 makes the computer 4 recognize a state of rotating the back door motor 2 to recognize a position of operating the back door. At this occasion, the computer 4 calculates a distance of moving or an angle of moving the back door by counting the pulse signal transmitted from the pulse detecting circuit 7.

The motor current detecting circuit 8 is connected to a shunt resistor 10 provided between a negative terminal of the power source of the back door motor 2 and a grand terminal. The motor current detecting circuit 8 detects voltage applied to the shunt resistor 10 and detects the current supplied to the back door motor 2 based on the detected value of the voltage and outputs a signal indicating the value of the current supplied to the back door motor 2 to the computer 4.

The computer 4 controls a duty ratio of the power source supplied from the back door motor driver 6 to the back door motor 2 to control the revolution number of the back door motor 2 by detecting the distance of moving or the angle of moving the back door based on the pulse signal from the pulse detecting circuit 7. Thereby, the computer 4 operates to open or operates to close the back door at a speed in accordance with the distance of moving or the angle of moving the back door.

Further, the computer 4 executes a pinching detecting processing for detecting pinching of an obstacle of the back door based on the distance of moving the back door and the value of the current supplied to the back door motor 2 currently detected by the motor current detecting circuit 8. Here, as the pinching brought about in operating to close the back door, there is a case of pinching an obstacle of the hand of the operator or the like. Further, as the pinching brought about in operating to open the back door, there is a case in which a body of the operator is pinched by a wall and the back door when there is a wall or the like on the rear side of the vehicle and the operator is present between the vehicle and the wall. Therefore, the computer 4 is designed to execute the processing of detecting pinching of the back door not only in operating to close the back door but also in operating to open the back door. Further, details of the pinching detecting processing will be described later.

[Pinching Detecting Processing]

Next, an explanation will be given of processing procedures of a first pinching detecting processing and a second pinching detecting processing by the above-described back door automatic opening and closing apparatus. Further, the pinching detecting processing is executed, for example, at every predetermined time period when the back door is operated to open and close.

[First Pinching Detecting Processing]

Figure 2:
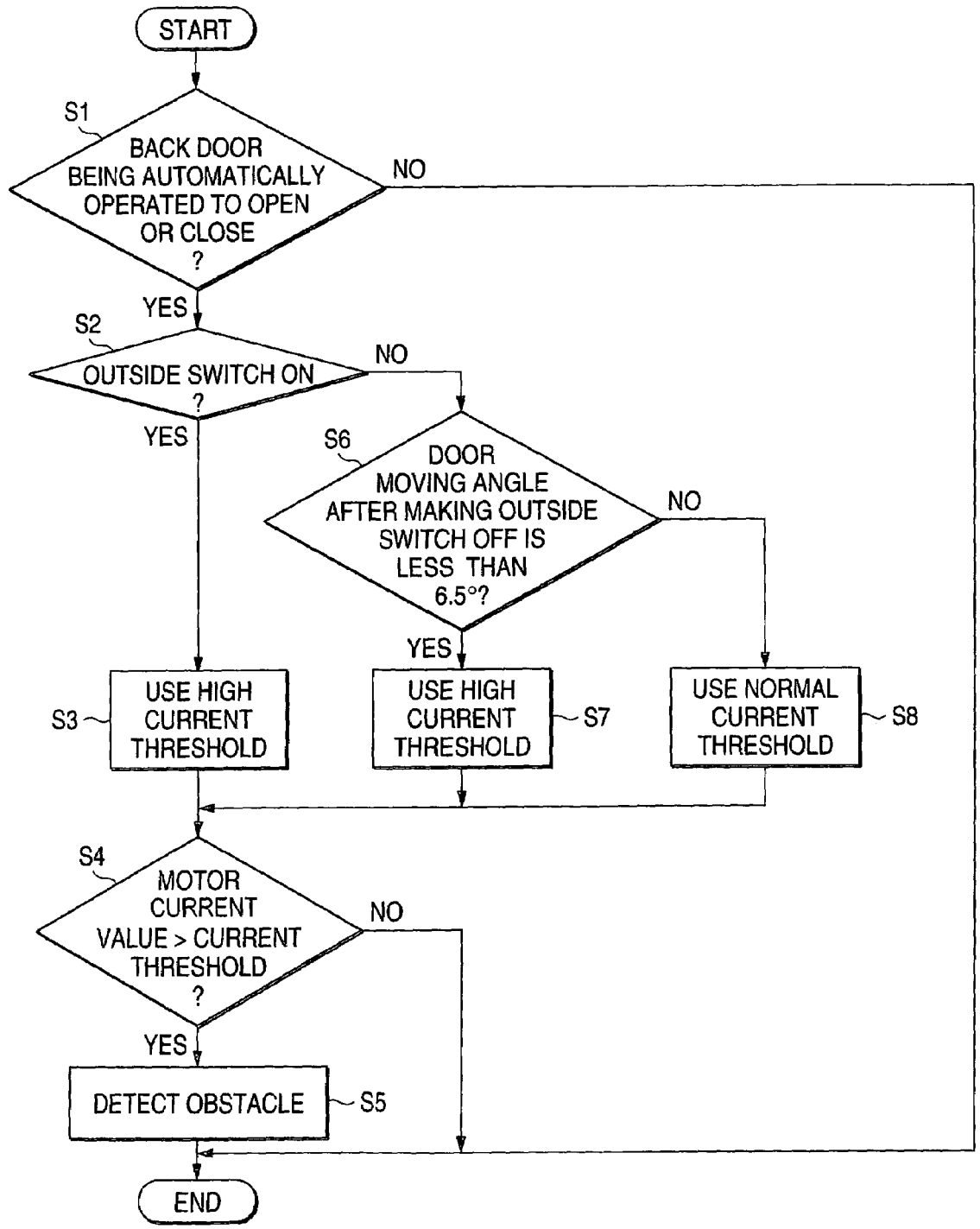
FIG. 2 is a flowchart showing a processing procedure of a first pinching detecting processing by the back door opening and closing apparatus to which the invention is applied.

According to the first pinching detecting processing, as shown by FIG. 2, when it is inputted from the input circuit 3 that operation of the outside switch 1 is brought into the ON state by operating by the operator for operating the back door from the closed state to the opened state, or when the back door is operated to open or close from a remoter controller, not illustrated, in reference to previously set map data describing a back door speed relative to a position of moving the back door, the back door speed is recognized based on the map data by the computer 4. Further, the computer 4 supplies the control signal to the back door motor driver 6 to supply current of the power source 5 to the back door motor 2 such that the back door is automatically opened and closed. Thereby, the back door motor 2 is supplied with motor current in accordance with the back door moving distance.

Under the state, first, at step S1, the computer 4 determines whether the back door is being automatically operated to open or close by the torque generated by the back door motor 2 based on the motor current detected by the motor current detecting circuit 8 or the pulse signal from the pulse detecting circuit 7.

Further, when it is determined that the back door is being operated to open or close automatically, the computer 4 executes the pinching detecting processing thereafter by making the processing proceed to the step S2. Meanwhile, when it is determined that the back door is not being operated to open or close automatically, the computer 4 determines a case in which the back door is operated manually or a case in which the back door is not opened or closed to finish the processing without executing the pinching detecting processing.

At successive step S2, the ON/OFF state of the outside switch 1 is determined based on the signal inputted via the input circuit 3 to determine whether the outside switch 1 is brought into the ON state by the computer 4. Thereby, the computer 4 determines whether the door knob portion of the back door is brought into a state of being grabbed by the hand of the operator.

Further, when it is determined that the outside switch 1 is brought into the ON state and the door knob portion of the back door is grabbed by the hand of the operator, the computer 4 makes the processing proceed to step S3. Meanwhile, when it is determined that the outside switch 1 is not brought into the ON state and the door knob portion of the back door is not grabbed by the hand of the operator, the computer 4 makes the processing proceed to step S6.

When the door knob portion is grabbed by the operator, there is a case in which the back door is gradually pulled up and at that occasion, a value of the current flowing in the back door motor 2 is increased. In order to prevent erroneous operation or erroneous determination from being brought about at that occasion, at successive step S3, the current threshold for detecting whether pinching is brought about is set to a high value (second threshold) by the computer 4. Thereby, the computer 4 determines the current threshold compared with the motor current in detecting pinching and makes the processing proceed to step S4.

At successive step S4, the motor current value based on the signal from the motor current detecting circuit 8 and the determined current threshold are compared by the computer 4 and when it is determined that the motor current value is larger than the current threshold, it is predicted that the back door pinches an obstacle. In accordance therewith, the computer 4 executes a processing of, for example, cutting the motor current and supplying motor current of rotating the back door motor reversely to the back door motor 2. In contract thereto, when it is determined that the motor current value is not larger than the current threshold, the computer 4 predicts that the pinching of the back door is not brought about to finish the processing.

Meanwhile, when it is determined that the outside switch 1 is not brought into the ON state at step S2, at step S6, it is determined whether the angle of moving the back door (distance of moving back door) after detecting the OFF state of the outside switch 1 is less than a predetermined angle by the computer 4. Here, although the predetermined angle of the distance of moving the back door is set to, for example, 6.5 degrees, the predetermined angle is not limited thereto but may be set to a different value in consideration of a movable range of the back door or the like. When the door knob portion is grabbed by the operator, there is a case of rapidly pulling up the back door, in that case, the value of the current flowing to the back door motor 2 is reduced. Further, in this case, when the operator detaches the hand from the door knob portion to release grabbing, the load of the back door motor 2 is rapidly increased and therefore, normally, the value of the current flowing in the back door motor 2 is rapidly increased. Occurrence of erroneous operation or erroneous determination by rapidly increasing the current value is prevented within a range of moving the back door by the predetermined angle after the operator detaches the hand from the door knob portion.

Further, when it is determined that the angle of moving the back door is less than the predetermined angle, the computer 4 sets the current threshold to a high value (second threshold) similar to step S3. Meanwhile, when it is determined that the angle of moving the back door is not less than the predetermined angle, that is, equal to or larger than the predetermined angle, the computer 4 set a normal current threshold (first threshold) lower than the high current threshold (second threshold) set at step S3 or step S7. When the current threshold is set in this way, the computer 4 executes processings at and after step S4 as described above to finish the processing.

Figure 3:
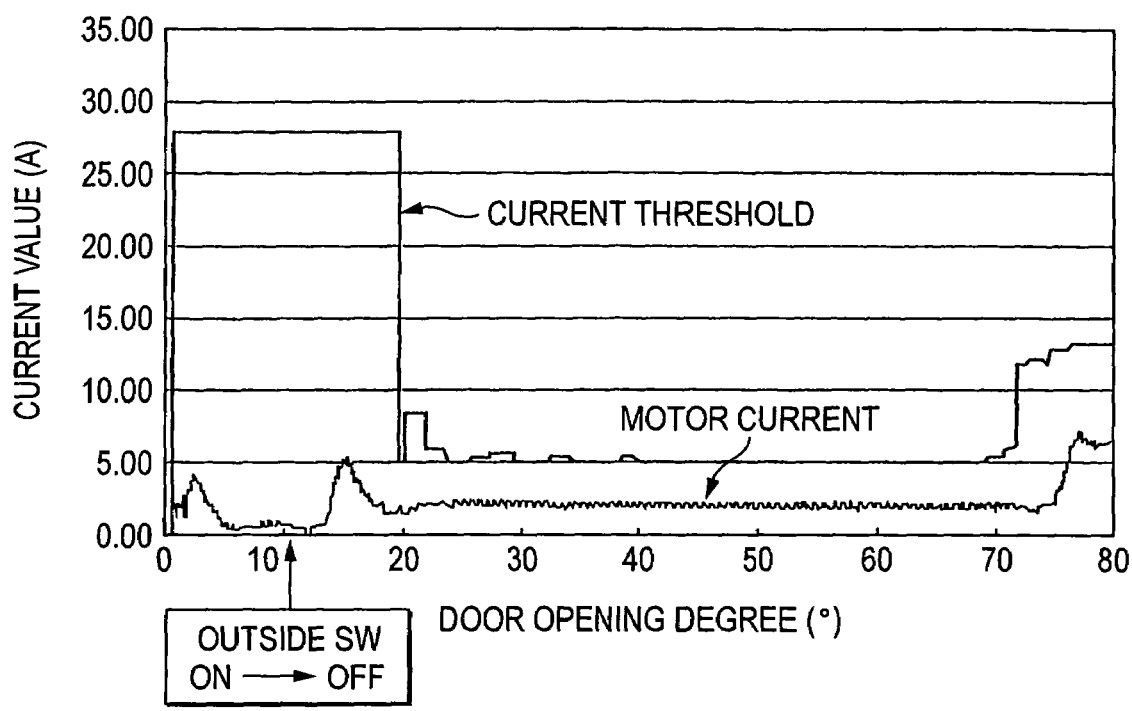
FIG. 3 is a diagram for explaining a relationship between a current threshold and a motor current when the first pinching detecting processing is executed.

According to the back door automatic opening and closing apparatus for executing the first pinching detecting processing, when the outside switch is brought into the ON state, presence or absence of occurrence of pinching is detected by setting the threshold to the high current threshold (step S2, step S3, step S4, step S5) and even when the outside switch 1 is brought into the OFF state from the ON state, in the case in which the angle of moving the back door is less than the predetermined angle after bringing about the OFF state, presence or absence of occurrence of pinching is detected while setting the threshold to the high current threshold (step S2, step S6, step S7, step S4, step S5). Thereby, according to the back door automatic opening and closing apparatus, as shown by FIG. 3, when the outside switch 1 is brought into the OFF state from the ON state, that is, when the speed of the back door is reduced by bringing about a state in which power is not applied to the back door by the operator, even when the motor current is temporarily increased for constituting the back door speed in accordance with the angle of moving the back door, occurrence of pinching is not erroneously detected.

Figure 4:
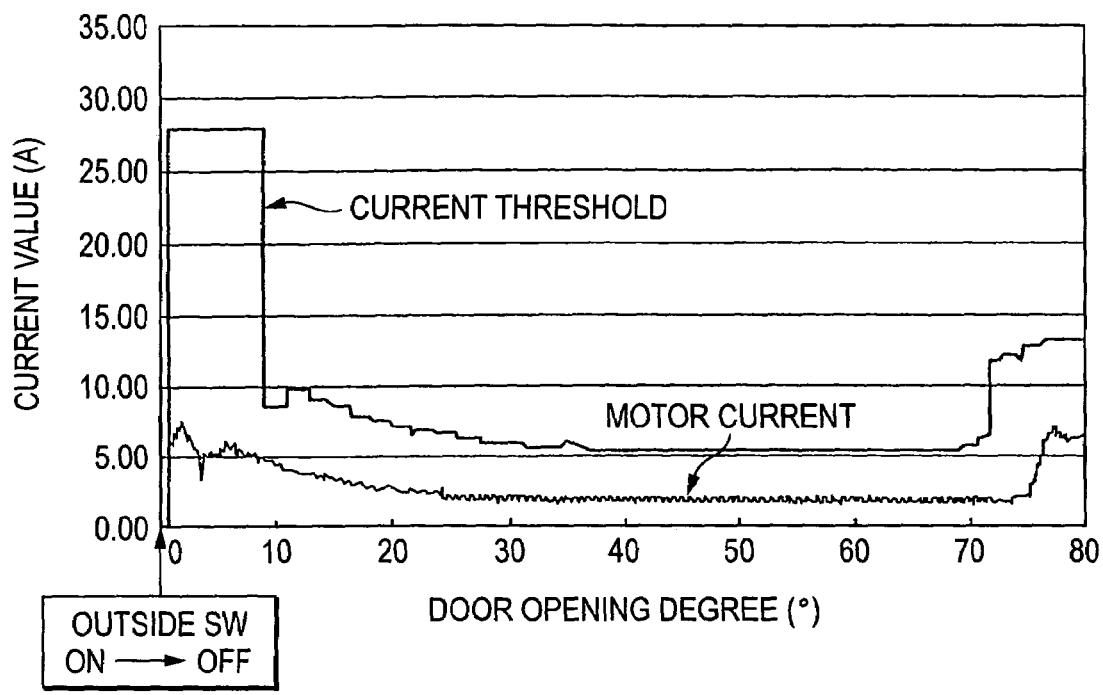
FIG. 4 is a diagram for explaining a relationship between the current threshold and the motor current when a back door is not operated by the hand of an operator.

Further, according to the back door automatic opening and closing apparatus, in normal operation in which the back door is pulled up without grabbing the door knob portion by the hand of the operator, the motor current and the current threshold become as shown by FIG. 4. That is, in normal operation, in the back door automatic opening and closing apparatus, when the angle of moving the back door is 0 degree through 10 degrees and 70 degrees through 80 degrees, the high current threshold is constituted to lower a sensitivity of detecting pinching at a position of finishing to open or close the back door.

Figure 5:
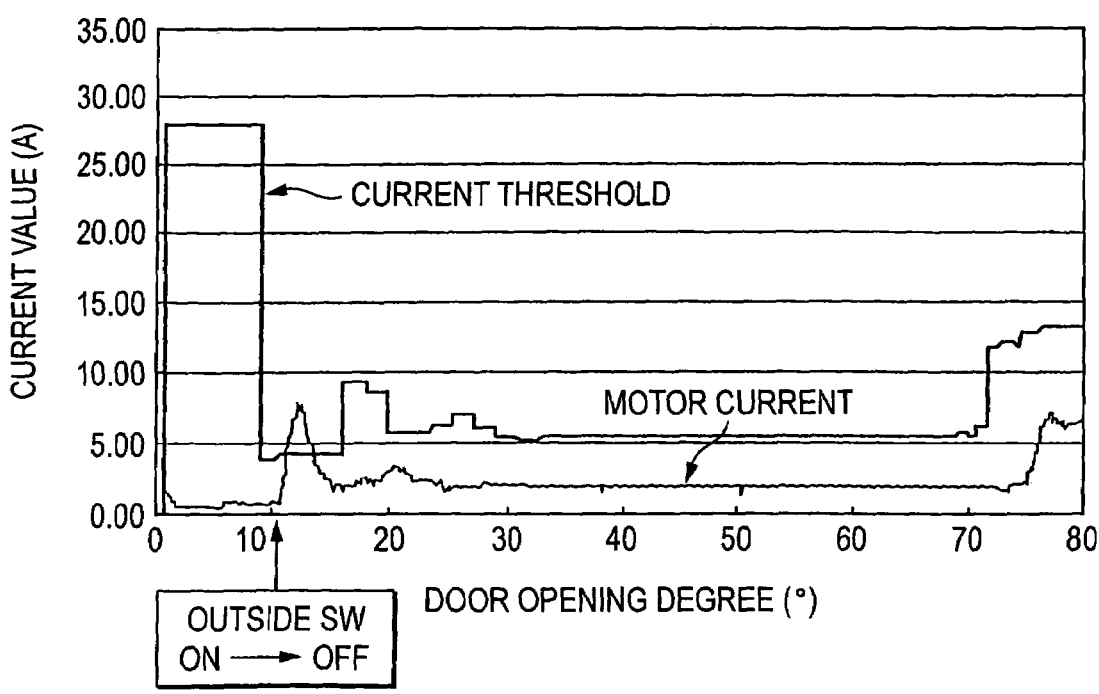
FIG. 5 is a diagram for explaining a relationship between the current threshold and the motor current when the first pinching detecting processing is not executed.

In contract thereto, according to the back door automatic opening and closing apparatus in which the first pinching detecting processing is not executed, as shown by FIG. 5, when the hand of the operator is detached from the back door after starting to open or close the back door, the increased motor current becomes higher than the low current threshold. Therefore, although occurrence of pinching an obstacle is not brought about, it is detected that the obstacle were pinched and there is brought about a drawback of, for example, the motor current is cut and the motor current for reversely rotating the back door motor 2 is supplied to the back door motor 2. Therefore, according to the back door automatic opening and closing apparatus for executing the first pinching detecting processing, such a drawback can firmly be avoided.

[Second Pinching Detecting Processing]

Next, an explanation will be given of a second pinching detecting processing different from the first pinching detecting processing.

Figure 6:
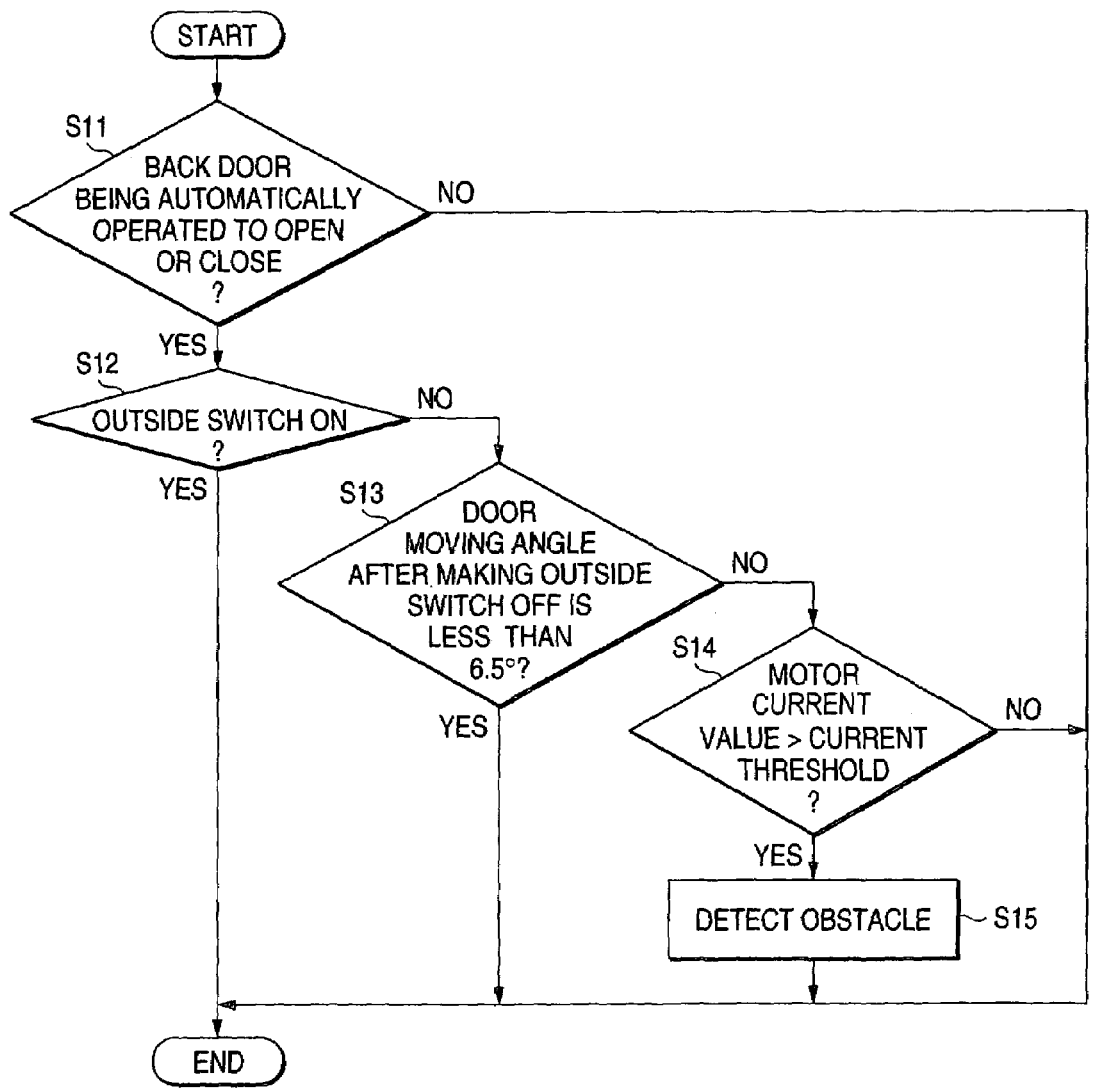
FIG. 6 is a flowchart showing a processing procedure of a second pinching detecting processing by the back door opening and closing apparatus to which the invention is applied.

According to the second pinching detecting processing, as shown by FIG. 6, it is determined whether the outside switch 1 is brought into the ON state in automatically operating to open and close the back door by executing processings similar to those of step S1 and S2 at step S11 and step S12 by the computer 4.

Further, when it is determined that the outside switch 1 is brought into the ON state, the computer 4 is brought into a stationary state of not detecting pinching of an obstacle to finish the processing. That is, the computer 4 does not detect pinching of an obstacle when the door knob portion is grabbed by the operator by being brought into the stationary state of not executing the above-described processings of step S4 and step S5.

Meanwhile, when it is determined that the outside switch 1 is not brought into the ON state, the computer 4 executes a processing similar to that of step S6 at step S13, and when the angle of moving the back door after bringing the outside switch 1 into the OFF state is less than the predetermined angle, the computer 4 is brought into the stationary state of not detecting pinching of an obstacle to finish the processing. In contrast thereto, when it is determined that angle of moving the back door after bringing the outside switch 1 into the OFF state is not less than the predetermined angle, the computer 4 detects pinching of the obstacle by executing processings similar to those of step S4 and step S5 at step S14 and step S15.

According to the back door automatic opening and closing apparatus for executing such a second pinching detecting processing, when the hand of the operator grabs the door knob portion to operate to open or close the back door, or during a time period in which the hand of the operator is detached from the door knob portion and the back door is moved by the predetermined angle, there is brought about the stationary state in which pinching of the obstacle is not detected and therefore, similar to the first pinching detecting processing, it can be avoided that pinching of the obstacle is detected at an instance of detaching the hand of the operator from the door knob portion.

Further, the above-described embodiments are an example of the invention. Therefore, the invention is not limited to the above-described embodiments but can naturally be changed variously in accordance with design or the like within the range not deviated from the technical thought according to the invention even in other than the embodiments.

What is claimed is:

1. A door opening and closing apparatus for a vehicle comprising:
    means for moving a motor by a current in accordance with a moving speed of the door to thereby generate an operating torque to open or close the door;
    means for detecting a griping of an operator's hand at a door knob portion in the door;
    means for detecting a moving amount of the door; and
    means for detecting a pinching of an obstacle by comparing the current and a current threshold which is set in accordance with the gripping and the moving amount;

wherein in a case that a non-grip state where the door knob portion is not gripped is detected after a grip state where the door knob portion is gripped as well as that the moving amount of the door in said non-grip state is less than a predetermined value, a detection of the pinching is executed based on a second current threshold which is higher than a first current threshold for the non-grip state.

2. A door opening and closing apparatus for a vehicle comprising:
   means for moving a motor by a current in accordance with a moving speed of the door to thereby generate an operating torque to open or close the door;
   means for detecting a gripping of an operator's hand at a door knob portion in the door;
   means for detecting a moving amount of the door; and
   means for detecting a pinching of an obstacle by comparing the current and a current threshold which is set in accordance with the gripping and the moving amount;
   wherein, in a case that a non-grip state where the door knob portion is not gripped is detected after the grip state where the door knob portion is gripped,
   a detection of the pinching is executed by the second current threshold which is higher than the first current threshold for the non-grip state.

3. A door opening and closing apparatus for a vehicle comprising:
   means for moving a motor by a current in accordance with a moving speed of the door to thereby generate an operating torque to open or close the door;
   means for detecting a gripping of an operator's hand at a door knob portion in the door;
   means for detecting a moving amount of the door; and
   means for detecting a pinching of an obstacle by comparing the current and a current threshold;
   wherein in a case that a non-grip state where the door knob portion is not gripped is detected after a grip state where the door knob portion is gripped as well as that the moving amount of the door in said non-grip state is less than a predetermined value,
   a detection of the pinching is not performed.

4. A door opening and closing apparatus for a vehicle comprising:
   means for moving a motor by a current in accordance with a moving speed of the door to thereby generate an operating torque to open or close the door;
   means for detecting a gripping of an operator's hand at a door knob portion in the door;
   means for detecting a moving amount of the door; and
   means for detecting a pinching of an obstacle by comparing the current and a current threshold;
   wherein in a case that a grip state where the door knob portion is gripped is detected,
   a detection of the pinching is not executed when the grip state is detected.

5. A door opening and closing apparatus for a vehicle comprising:
   a motor operating to open or operating to close a door of a vehicle;
   an operating switch provided at a knob portion of the door of the vehicle for generating an ON signal for operating to open the door of the vehicle when the operating switch is operated and generates an OFF signal when the operating switch is not operated;
   a pulse detecting circuit for detecting a period of rotating the motor to convert into a pulse signal;
   a motor current detector for detecting a current flowing in the motor; and
   a computer connected to the operating switch and supplied with the pulse signal from the pulse detecting circuit for recognizing a position of operating and an angle of moving the door by counting the pulse signal, determining a value of the current supplied to the motor based on the recognized operating position, controlling the value of the current supplied to the motor, further, supplied with a detected value of the current from the motor current detector, comparing the value of the current detected by the motor current detector with a previously determined first threshold and controlling to cut the current supplied to the motor when the current value detected by the motor current detector exceeds the first threshold;
   wherein the computer detects an ON signal and an OFF signal supplied from the operating switch and when the ON signal supplied from the operating switch is detected to change to the OFF signal, during a time period in which the angle of moving the door is moved to a previous determined angle, the computer compares a second threshold larger than the first threshold with the value of the current detected by the motor current detector and controls to cut the current supplied to the motor when the value of the current detected by the motor current detector exceeds the second threshold.

6. A door opening and closing apparatus for a vehicle comprising:
   a motor for operating to open or operating to close a door of a vehicle;
   an operating switch provided at a knob portion of the door of the vehicle for generating an ON signal for operating to open the door of the vehicle when the operating switch is operated and generating an OFF signal when the operating switch is not operated;
   a pulse detecting circuit for detecting a period of rotating the motor to convert into a pulse signal;
   a motor current detector for detecting the current flowing in the motor; and
   a computer connected to the operating switch and supplied with the pulse signal from the pulse detecting circuit for recognizing a position of operating and an angle of moving the door by counting the pulse signal, determining a value of the current supplied to the motor based on a recognized operating position, controlling the value of the current supplied to the motor, further, supplied with a detected value of the current from the motor current detector, comparing the value of the current detected by the motor current detector with a previously determined first threshold and controlling to cut the current supplied to the motor when the current value detected by the motor current detector exceeds the first threshold;
   wherein the computer detects an ON signal and an OFF signal supplied from the operating switch and when the ON signal supplied from the operating switch is detected to change to the OFF signal, during a time period in which the angle of moving the door is moved to a previously determined angle, the computer prohibits the comparison between the first threshold value and the current value detected by the motor current detector.

* * * * *